US008510923B2

(12) United States Patent
Ward

(10) Patent No.: US 8,510,923 B2
(45) Date of Patent: Aug. 20, 2013

(54) APPARATUS FOR INSTALLING A SCREEN IN A FRAME

(76) Inventor: Jeffrey H. Ward, Port St. Lucie, FL (US)

( * ) Notice: Subject to any disclaimer, the term of this patent is extended or adjusted under 35 U.S.C. 154(b) by 862 days.

(21) Appl. No.: 12/581,344

(22) Filed: Oct. 19, 2009

(65) Prior Publication Data

US 2010/0122443 A1 May 20, 2010

Related U.S. Application Data

(60) Provisional application No. 61/115,149, filed on Nov. 17, 2008.

(51) Int. Cl.
*B23P 19/02* (2006.01)
*B21F 33/02* (2006.01)

(52) U.S. Cl.
USPC ............................................ 29/235; 140/109

(58) Field of Classification Search
USPC .................... 29/235, 278, 450, 451; 140/109
See application file for complete search history.

(56) References Cited

U.S. PATENT DOCUMENTS

| | | | | | |
|---|---|---|---|---|---|
| 432,632 | A | | 7/1890 | Merriman | |
| 569,038 | A | | 10/1896 | Dow | |
| D32,083 | S | | 1/1900 | Conley | |
| 739,342 | A | * | 9/1903 | Peregrine | 140/109 |
| 739,343 | A | * | 9/1903 | Peregrine | 140/109 |
| 1,556,234 | A | | 10/1925 | Maise | |
| 1,858,372 | A | | 5/1932 | McNaught et al. | |
| 2,638,131 | A | * | 5/1953 | Rohs | 140/109 |
| 2,661,487 | A | | 12/1953 | Hicks et al. | |
| 2,761,199 | A | * | 9/1956 | Allen | 29/235 |
| 2,835,037 | A | | 5/1958 | Middents | |
| 3,077,907 | A | * | 2/1963 | Gottlieb | 140/109 |
| 3,284,886 | A | * | 11/1966 | Provencher | 29/235 |
| 3,307,249 | A | * | 3/1967 | Hohoff | 29/235 |
| 3,541,660 | A | | 11/1970 | Soto | |
| 3,734,481 | A | | 5/1973 | Surwill | |
| 3,828,832 | A | * | 8/1974 | Hartman | 140/109 |
| 4,005,735 | A | | 2/1977 | Miyamoto | |
| 4,005,737 | A | * | 2/1977 | Nason | 140/109 |
| 4,021,909 | A | | 5/1977 | Bollmer | |
| 4,169,305 | A | * | 10/1979 | Kruszona | 29/235 |
| 4,172,313 | A | * | 10/1979 | Takahashi | 29/235 |
| 4,197,605 | A | * | 4/1980 | King | 7/105 |
| 4,241,487 | A | * | 12/1980 | Kraver | 29/278 |
| 4,528,736 | A | * | 7/1985 | Hope et al. | 29/235 |
| 4,578,851 | A | * | 4/1986 | Song | 29/235 |
| 4,730,378 | A | * | 3/1988 | Sweeny et al. | 29/278 |
| 4,761,882 | A | * | 8/1988 | Silverstein | 30/162 |
| 4,765,771 | A | * | 8/1988 | Howsley | 404/74 |
| 4,790,059 | A | * | 12/1988 | Killpack | 29/451 |
| 4,899,429 | A | * | 2/1990 | Londono | 29/235 |
| 4,910,821 | A | * | 3/1990 | Kieferle | 7/158 |
| 4,916,790 | A | * | 4/1990 | Vlahogeorge | 29/235 |
| D312,376 | S | * | 11/1990 | Sweeny et al. | D8/14 |
| 5,052,093 | A | * | 10/1991 | Urlacher | 29/235 |

(Continued)

*Primary Examiner* — Lee D Wilson
*Assistant Examiner* — Jamal Daniel
(74) *Attorney, Agent, or Firm* — Fraser Clemens Martin & Miller LLC; William J. Clemens

(57) ABSTRACT

An apparatus for installing a screen material includes a main body having a tube disposed therethrough, the tube adapted to receive a spline material, a leg having a rotatably attached insertion wheel coupled to the main body, and an alignment wheel rotatably coupled to the body in alignment with the insertion wheel.

17 Claims, 4 Drawing Sheets

(56) References Cited

U.S. PATENT DOCUMENTS

| | | | | | |
|---|---|---|---|---|---|
| 5,127,143 | A | * | 7/1992 | Urlacher | 29/235 |
| 5,735,032 | A | * | 4/1998 | Stone | 29/235 |
| 5,829,113 | A | * | 11/1998 | Socci et al. | 29/451 |
| 5,979,036 | A | * | 11/1999 | Socci et al. | 29/451 |
| 6,131,260 | A | * | 10/2000 | Catt | 29/235 |
| 6,915,549 | B2 | * | 7/2005 | Forsberg et al. | 29/278 |
| 2004/0258480 | A1 | * | 12/2004 | Prisby | 405/184.4 |
| 2010/0122443 | A1 | * | 5/2010 | Ward | 29/235 |

* cited by examiner

APPARATUS FOR INSTALLING A SCREEN IN A FRAME

CROSS-REFERENCE TO RELATED APPLICATION

This application claims the benefit of U.S. Provisional Patent Application No. 61/115,149 filed on Nov. 17, 2008.

FIELD OF THE INVENTION

The present invention generally relates to an apparatus for installing new screen material in frames of existing screen windows and screen doors.

BACKGROUND OF THE INVENTION

It has long been known that one technique for holding a screen material in a frame is to provide a narrow channel in the frame and bend the screen to fit within the channel. Thereafter, a pliable spline material, such as rubber, is inserted into the channel holding the bent screen wire for releasably affixing the screen to the frame.

In the past, portable hand tools have been developed to assist a workman in affixing a screen material to the screen frame. Examples of such tools are shown in U.S. Pat. Nos. 739,342 and 739,343, both in the name of Peregrine and U.S. Pat. No. 4,241,487 in the name of Kraver. Other machines, such as shown in U.S. Pat. No. 3,077,907 in the name of Gottlieb, have been developed for installing screen in a frame in an automated fabrication line, but such machines are of little use to a workman installing a screen while in the field such as a customer's home, for example.

Two major problems exist with the prior art. The first problem, typical of the portable tools, such as shown in the two Peregrine or the Kraver patents, is that several simultaneous steps are required of the workman in order to install the screen. First, one side of the prior art portable tool is used to bend the screen into the channel of the frame. After this has been completed, the workman holds the screen in the frame channel with one hand, while positioning a length of pliable spline into the frame channel with the other hand and using the opposite end of the tool to insert the spline. This can be a difficult process for someone of limited experience. The second problem is that a machine which installs the screen in a single step involves bulky and complex apparatus, such as shown in the Gottlieb patent, and is not easily adaptable to be taken into the field by a workman needing to repair or replace existing screen on, for example, a conventional household window or door screen.

It would be desirable to develop a portable apparatus that can be easily carried by a workman and can install a screen in a frame in a single pass.

SUMMARY OF THE INVENTION

Concordant and consistent with the present invention, a portable apparatus that can be easily carried by a workman and can install a screen in a frame in a single pass, has surprisingly been discovered.

In one embodiment, an apparatus for installing a screen material comprises: a main body having a tube disposed therethrough, the tube adapted to receive a spline material; a leg having a rotatably attached insertion wheel coupled to the main body; and an aligment wheel rotatably coupled to the main body in alignment with the insertion wheel.

In another embodiment, an apparatus for installing a screen material comprises: a main body having a first portion coupled to a second portion to secure a tube therebetween; a leg having a rotatably attached insertion wheel disposed adjacent the first portion and the second portion and secured therebetween; and an alignment wheel rotatably coupled to the body in alignment with the insertion wheel.

In yet another embodiment, an apparatus for installing a screen material comprises: a main body having a first portion coupled to a second portion to form a cavity; a tube disposed in the cavity to provide a conduit through a portion of the main body; a leg having a retaining head disposed at one end and a rotatably attached insertion wheel disposed at an opposite end thereof, wherein the leg is disposed between the first portion and the second portion and secured therebetween; and an alignment wheel rotatably coupled to the body in alignment with the insertion wheel.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

Figure 1:
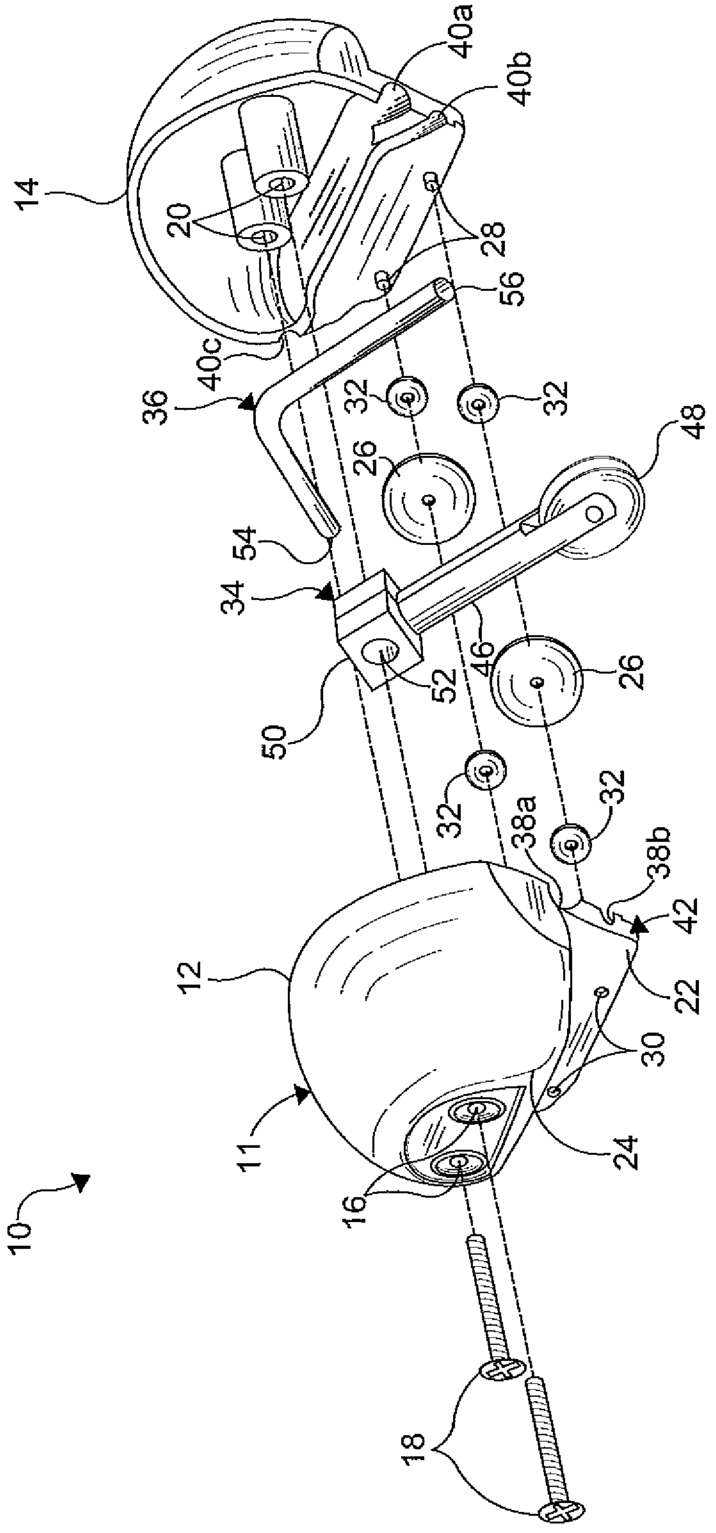
FIG. 1 is an exploded perspective view of an apparatus for installing new screen material according to an embodiment of the present invention.
Figure 2:
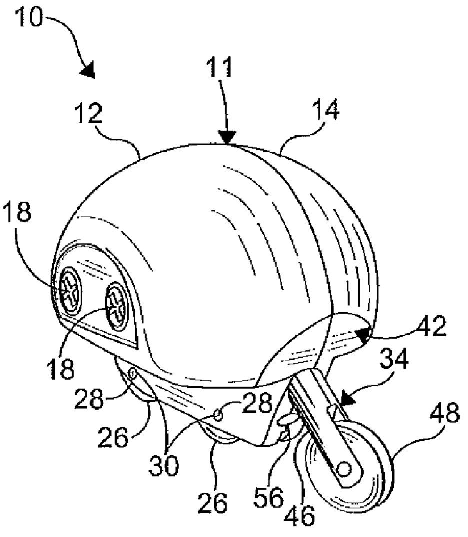
FIG. 2 is a rear perspective view of the apparatus of FIG. 1.
Figure 3:
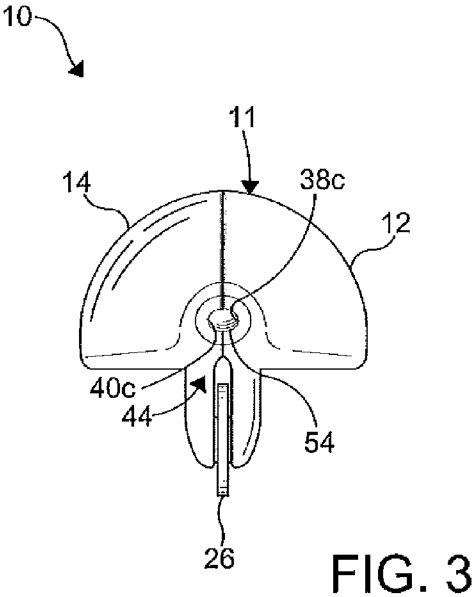
FIG. 3 is a front elevational view of the apparatus of FIG. 1.

The following detailed description and appended drawings describe and illustrate various embodiments of the invention. The description and drawings serve to enable one skilled in the art to make and use the invention, and are not intended to limit the scope of the invention in any manner.

Referring to FIGS. 1-4, an apparatus 10 for installing a screen material into existing frames, windows, doors and the like, is illustrated. As shown, the apparatus 10 includes a main body 11 having a first portion 12 and a second portion 14. In the embodiment shown, the first portion 12 and the second portion 14 cooperate to form a cavity therebetween. As a non-limiting example, the main body 11 may be substantially solid. The first portion 12 includes a plurality of coupling apertures 16, wherein each of the apertures 16 receives a coupling device 18 therethrough. The second portion 14 includes a plurality of threaded retaining mounts 20 for receiving the coupling devices 18 to secure the first portion 12 to the second portion 14. As shown, the main body 11 is generally egg-shaped and has a flange portion 22 and a cap portion 24. It is understood that any size and shape may be used. It is further understood that the main body 11 may be a unitary body.

In the embodiment shown, a plurality of alignment wheels 26 are rotatably coupled to the flange portion 22 of the main body 11. In one embodiment, the second portion 14 includes a plurality of protrusions 28 and the first portion 12 includes a plurality of wheel apertures 30 to receive the protrusions 28. As such, the protrusions 28 are inserted through a center aperture of the alignment wheels 26 to operate as an axle. As a non-limiting example, a plurality of bearings 32 are disposed between the alignment wheels 26 and the main body 11 to minimize friction therebetween. It is understood that the alignment wheels 26 may be rotatably coupled to a bottom cover (not shown) that releasably attaches to the main body 11.

The main body 11 is adapted to receive and retain a leg 34 and a tube 36. In the embodiment shown, the first portion 12 includes a plurality of first indents 38*a*, 38*b*, 38*c* having a semi-circular shape and the second portion 14 includes a plurality of second indents 40*a*, 40*b*, 40*c* having a semi-circular shape. When the first portion 12 and the second portion 14 are aligned and coupled together, the first indents 38*a*, 38*b*, 38*c* cooperate with the second indents 40*a*, 40*b*, 40*c* to define apertures in the main body 11 to receive and retain the leg 34 and the tube 36.

In particular, one of the first indents 38*a* cooperates with one of the second indents 40*a* to receive a portion of the leg 34. In the embodiment shown, one of the first indents 38*b* is disposed on a first end 42 of the main body 11 and is adapted to cooperate with one of the second indents 40*b* and one of the first indents 38*c* is disposed on a second end 44 of the main body 11 and adapted to cooperate with one of the second indents 40*c*. As such, the first indents 38*b*, 38*c* and the second indents 40*b*, 40*c* cooperate to receive and retain the tube 36, thereby providing a conduit through a portion of the main body 11. As a non-limiting example, the first indent 38*a* and the second indent 40*a*, which receive the leg 34 have a larger diameter than the other first indents 38*b*, 38*c* and second indents 40*b*, 40*c*. It is understood that the first indents 38*a*, 38*b*, 38*c* and the second indents 40*a*, 40*b*, 40*c* may have any size and shape. It is understood that the first indents 38*a*, 38*b*, 38*c* and the second indents 40*a*, 40*b*, 40*c* may be formed in any portion of the main body 11.

The leg 34 includes a shaft 46 having an insertion wheel 48 disposed on one end thereof and a retaining head 50 disposed on an opposite end thereof. In the embodiment shown, the shaft 46 is a split shaft formed from two pieces, wherein the insertion wheel 48 is secured by a protrusion/aperture arrangement (not shown) similar to the protrusion 28 and the apertures 30 of the main body 11. As a non-limiting example, the insertion wheel 48 is aligned with the wheels 26 coupled to the main body 11.The retaining head 50 includes an aperture 52 formed therein. In certain embodiments, the coupling device 18 is inserted through the aperture 52 of the retaining head 50 and then coupled to the retaining mount 20 of the second portion 14. In this way, the leg 34 is securely coupled to the main body 11.

The tube 36 is a hollow conduit having a generally L-shaped body. However, it is understood that the tube 36 may have a shape. The tube 36 is disposed in the main body 11 to provide a passage for a spline material 53 to pass therethrough. As shown, the tube 36 includes a first end 54, which operates as an inlet for the spline material 53 and a second end 56, which operates as an outlet for the spline material 53. In the embodiment shown, the second end 56 is disposed adjacent the insertion wheel 48 and aligned therewith.

Figure 4:
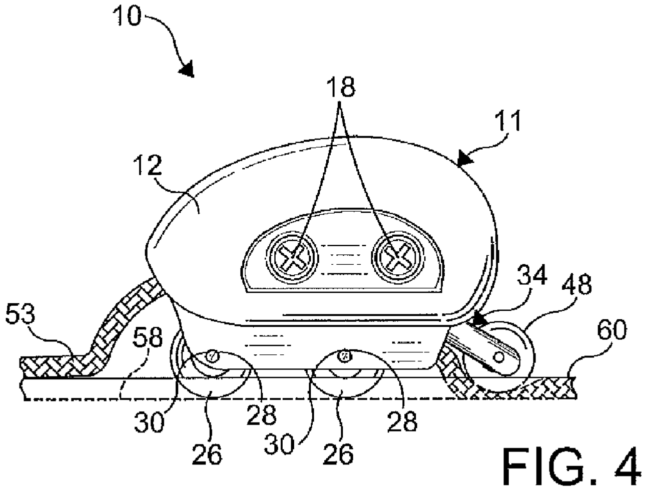
FIG. 4 is a side elevational view of the apparatus of FIG. 1.
Figure 5:
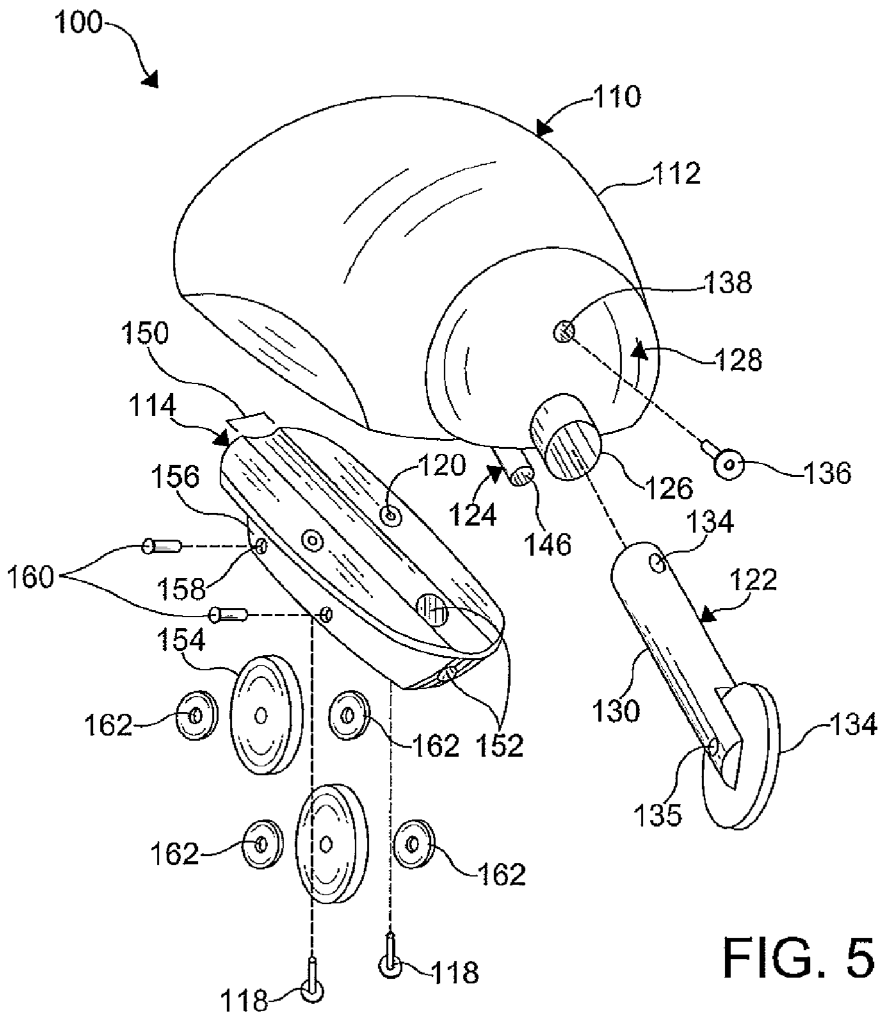
FIG. 5 is an exploded perspective view of an apparatus for installing new screen material according to another embodiment of the present invention.
Figure 6:
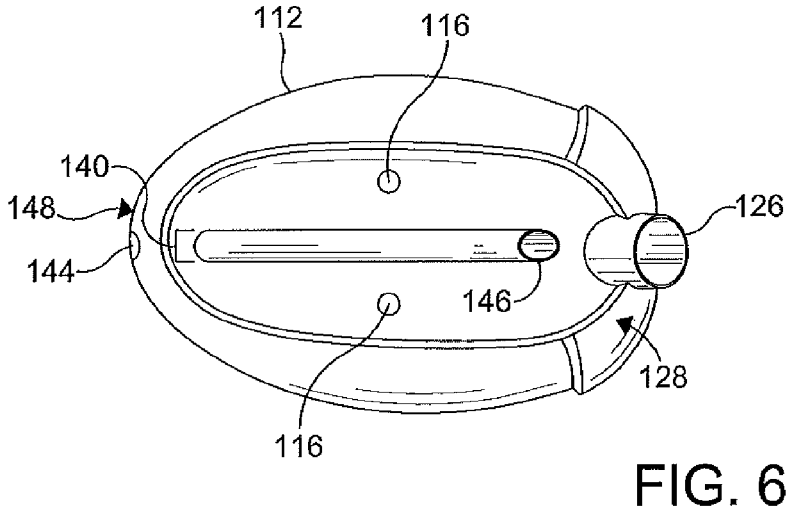
FIG. 6 is a bottom plan view of a first portion of a main body of the apparatus of FIG. 5.
Figure 7:
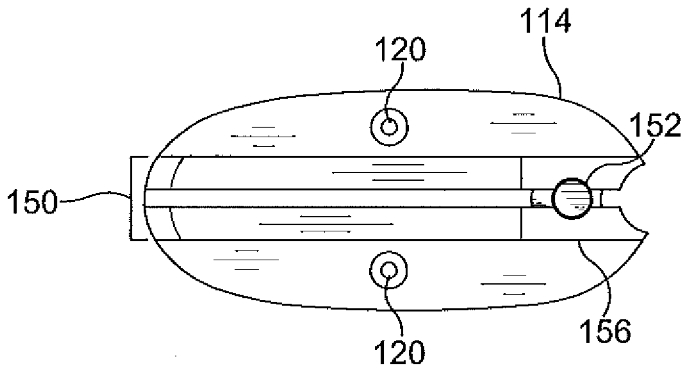
FIG. 7 is a bottom plan view of a second portion of a main body of the apparatus of FIG. 5.

In use, a user engages the cap portion 24 of the main body 11 to guide the insertion wheel 48 and alignment wheels 26 along a channel 58 of a frame 60 for retaining a screen material. The alignment wheels 26 cooperate with the insertion wheel 48 to provide alignment of the insertion wheel 48 with the appropriate channel 58. As such, the alignment wheels 26 and the insertion wheel 48 bend a screen (not shown) into the channel 58 of the frame 60. In certain embodiments, the spline material 53 or retaining strip is fed through the tube 36 such that the insertion wheel 48 engages the spline material 53 and presses it into the channel 58, as illustrated in FIG. 4. It is understood that the tube 36 provides a means for aligning and delivering the spline material 53 to the insertion wheel 48 for quick and easy installation into the channel 58 or other portion of the frame 60.

Referring to FIGS. 5-8, an apparatus 100 for installing a screen material into existing frames, windows, doors and the like, is illustrated according to another embodiment of the present invention. As shown, the apparatus 100 includes a main body 110 having a first portion 112 and a second portion 114. As shown, the first portion 112 is generally egg-shaped and substantially solid. It is understood that any size and shape may be used. It is further understood that the first portion 112 may be hollow.

The first portion 112 includes a plurality of coupling features 116, wherein each of the features 116 receives and engages a coupling device 118. As a non-limiting example, the coupling device 118 is a threaded retaining pin or screw. The second portion 114 includes a plurality of through holes 120 for receiving the coupling devices 118 therethrough to secure the first portion 112 to the second portion 114. However, it is understood that the main body 110 may be a unitary body.

The first portion 112 is adapted to receive and retain a leg 122 and a tube 124. As shown, the first portion 112 includes a retaining cylinder 126 disposed on a first end 128 thereof. The retaining cylinder 126 has an inside diameter that is larger than an outside diameter of the leg 122. The leg 122 includes a shaft 130 having an insertion wheel 132 disposed on one end thereof and a detent 134 disposed adjacent an opposite end thereof. In certain embodiments, the insertion wheel 132 is secured to the shaft 130 by a pin/aperture arrangement, wherein the shaft 130 includes an aperture (not shown) formed therein to receive a pin 135 therethrough. The pin 135 also extends through an aperture (not shown) formed in the insertion wheel 132 to secure the insertion wheel 132 to the shaft 130. The leg 122 is received by the retaining cylinder 126 and a threaded leg pin 136 is inserted through an aperture 138 formed in the first portion 112 to engage the detent 134 of the leg 122. As such, the leg pin 136 secures the leg 122 to the first portion 112.

The first portion 112 further includes a channel 140 formed therein to receive and secure the tube 124 to the first portion 112. The tube 124 is a hollow conduit having a generally L-shaped body. The tube 124 is disposed in the main body 110 to provide a passage for a spline material 142 to pass therethrough. As shown, the tube 124 includes a first end 144, which operates as an inlet for the spline material 142 and a second end 146, which operates as an outlet for the spline material 142. When the tube 124 is disposed in the channel 140 of the first portion 112, the second end 146 is disposed adjacent the insertion wheel 132 and aligned therewith. The first end 144 of the tube 124 extends through a second end 148 of the first portion 112 opposite the first end 128 to provide a passage for the spline material 142 to pass through the main body 110.

The second portion 114 of the main body 110 includes a reciprocal channel 150 aligned with the channel 140 of the first portion 112 to sandwich the tube 124 therebetween. The channel 150 of the second portion 114 includes a guide hole 152 for receiving the second end 146 of the tube 124 and allowing the tube 124 to pass through the second portion 114.

In the embodiment shown, a plurality of alignment wheels 154 are rotatably coupled to the second portion 114 of the main body 110. The second portion 114 includes a flanged portion 156 having a plurality of wheel apertures 158 formed therein. Each of the wheel apertures 158 receives a wheel pin 160 for securing the alignment wheels 154 to the second portion 114. Specifically, the wheel pins 160 are inserted through a center aperture of the alignment wheels 154 to operate as an axle. As a non-limiting example, a plurality of bearings 162 are disposed between the alignment wheels 154 and the second portion 114 to minimize friction therebetween.

Figure 8:
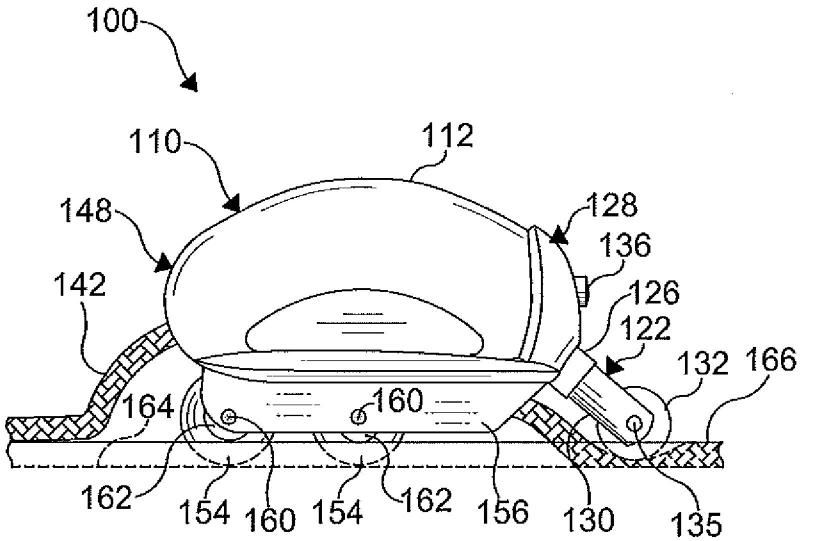
FIG. 8 is a side elevational view of the apparatus of FIG. 5.

In use, a user engages the first portion 112 of the main body 110 to guide the insertion wheel 132 and alignment wheels 154 along a channel 164 of a frame 166 for retaining a screen material. The alignment wheels 154 cooperate with the insertion wheel 132 to provide alignment of the insertion wheel 132 with the appropriate channel 164. As such, the alignment wheels 154 and the insertion wheel 132 bend a screen (not shown) into the channel 164 of the frame 166. In certain embodiments, the spline material 142 or retaining strip is fed through the tube 124 such that the insertion wheel 132 engages the spline material 142 and presses it into the channel 164, as illustrated in FIG. 8. It is understood that the tube 124 provides a means for aligning and delivering the spline material 142 to the insertion wheel 132 for quick and easy installation into the channel 164 or other portion of the frame 166.

Accordingly, the apparatus 10, 100 provides a portable, handheld tool for installing a screen material, wherein the bending of the screen and the installation of the spline material 53, 142 are executed in a single pass.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. An apparatus for installing a screen material, the apparatus comprising:

a main body having a tube disposed therethrough, the tube adapted to receive and form a passage for a spline material, the tube having an inlet at which the spline material enters and an outlet from which the spline material exits;

a leg having a rotatably attached insertion wheel coupled to the main body, wherein the main body has a first portion and a second portion coupled together and securing at least one of the tube and the leg therebetween; and an alignment wheel rotatably coupled to the main body in alignment with the insertion wheel wherein the outlet of the tube is positioned between the insertion wheel and the alignment wheel and directs the spline material exiting the outlet under the insertion wheel.

2. The apparatus according to claim 1, wherein at least one of the first portion and the second portion includes a cavity formed therein.

3. The apparatus according to claim 2, wherein a portion of the leg is disposed in the cavity.

4. The apparatus according to claim 2, wherein a portion of the tube is disposed in the cavity.

5. The apparatus according to claim 1, wherein at least a portion of the main body is substantially egg-shaped.

6. The apparatus according to claim 1, wherein the main body includes a flange portion and the alignment wheel is rotatably coupled thereto.

7. The apparatus according to claim 1, wherein the tube is generally “L” shaped.

8. The apparatus according to claim 1, wherein a coupling device is disposed through a portion of the main body and the leg to secure the leg to the main body.

9. An apparatus for installing a screen material, the apparatus comprising:

a body having a passage formed therein extending between an inlet and an outlet for passing a spline material through said body from said inlet to said outlet;

an insertion wheel rotatably attached to said body adjacent said outlet for engaging the spline material exiting said outlet, said outlet directing the exiting spline material under said insertion wheel; and an alignment wheel rotatably attached to said body adjacent said inlet, said outlet being positioned between said insertion wheel and said alignment wheel, wherein said body includes a first portion attached to a second portion, said insertion wheel and said alignment wheel being positioned between said first portion and said second portion.

10. The apparatus according to claim 9 wherein said body extends longitudinally between a first end and a second end, said inlet and said alignment wheel being positioned at said first end and said outlet and said insertion wheel being positioned at said second end.

11. The apparatus according to claim 9 including another alignment wheel rotatably attached to said body between said inlet and said outlet.

12. The apparatus according to claim 11 wherein said wheels are aligned along a longitudinal axis of said body.

13. The apparatus according to claim 9 wherein said passage is curved between said inlet and said outlet.

14. An apparatus for installing a screen material, the apparatus comprising:

a main body having a first portion coupled to a second portion and a passage formed between said first and second portions for passing a spline material through said body from an inlet to an outlet;

an insertion wheel rotatably attached to said body adjacent said outlet; and an alignment wheel rotatably attached to said body adjacent said inlet and in alignment with said insertion wheel, said outlet being positioned between said insertion wheel and said alignment wheel for directing the spline material from said outlet under said insertion wheel.

15. The apparatus according to claim 14 wherein said passage is curved between said inlet and said outlet.

16. The apparatus according to claim 14 including another alignment wheel rotatably attached to said body.

17. The apparatus according to claim 14 wherein said outlet is positioned at a first end of said body, said alignment wheel is a first alignment wheel positioned between said inlet and a second end of said body, said inlet is positioned at said second end of said body, said outlet is positioned between said insertion wheel and said first alignment wheel, and including a second alignment wheel positioned between said first alignment wheel and said outlet.

* * * * *